United States Patent [19]

Fields

[11] 4,262,698
[45] Apr. 21, 1981

[54] VALVE

[75] Inventor: Larry D. Fields, Myra Loma, Calif.

[73] Assignee: Yardney Electric Corporation, Pawcatuck, Conn.

[21] Appl. No.: 106,575

[22] Filed: Dec. 26, 1979

[51] Int. Cl.³ .............................................. F16K 1/36
[52] U.S. Cl. ................................. 137/625.5; 251/358
[58] Field of Search ...................... 137/625.5, 625.27; 251/358

[56] References Cited

U.S. PATENT DOCUMENTS

| 21,332 | 8/1858 | Fuller | 251/358 |
|---|---|---|---|
| 2,639,728 | 5/1953 | Briechle | 137/625.27 |
| 4,128,110 | 12/1978 | Haytayan | 137/625.27 X |

Primary Examiner—Arnold Rosenthal
Attorney, Agent, or Firm—Donald E. Nist

[57] ABSTRACT

An improvement is provided in a valve having a valve housing defining first and second valve openings and a valve sealing element in the housing. The improvement comprises a three-piece valve sealing element. That valve sealing element comprises a first hard retainer of metal or the like, a second generally cup shaped hard retainer of metal or the like and a resilient plastic component disposed between the first and second retainers and having an exposed sloped peripheral sealing surface which surface is adapted to engage the first valve opening defined within the valve housing. The second retainer has a curved peripheral surface engageable with the second valve opening within the valve housing, the two valve openings being spaced longitudinally from each other. The valve includes a valve stem connected to the valve sealing element for movement of said valve sealing element in the housing between the two valve openings. The valve openings are generally circular as are the plastic sealing component and the second retainer. Preferably the plastic sealing element comprises polyurethane and the two retainers comprise steel or stainless steel or the like. The valve stem is disposed longitudinally within the housing and the valve sealing element is secured to one end thereof and extends transversely of the housing. The first retainer may be a flat disc of smaller diameter than the sealing component and second retainer. The valve sealing element provides improved gradual closing of both the first and second openings in the housing. Moreover, the valve sealing element is readily assembled and disassembled for removal and substitution of the wearable valve sealing component. The valve sealing element is inexpensive, durable and efficient.

8 Claims, 2 Drawing Figures

VALVE

BACKGROUND OF THE INVENTION

1. Field of the Invention

The present invention generally relates to valves and more particularly to an improved valve sealing element having sealing surfaces at two different places thereon,

2. Prior Art

In conventional valves such as are utilized in water filtration systems and the like, economy and durability are important. One typical valve employs a longitudinally extending housing having a pair or more of valve openings defined internally of the housing in longitudinal sequence. A longitudinally extending valve stem or operator rod may be used to move & valve sealing element between adjacent valve openings in the valve housing. Conventional valve sealing elements utilized for such purposes are required to be dimensioned within close tolerances relative to the size and shape of the valve openings to permit proper closing of the openings by the valve elements. Such close tolerances increase the cost of production of the valves and it would be desirable to be able to provide an improved valve utilizing a sealing element which can be easily and inexpensively fabricated and assembled and which is easily disassembled and replaced as needed. Preferably, such valve sealing element should permit proper sealing of the valve openings while permitting reasonably large tolerances in size and shape between the valve sealing element and the openings. It would also be desirable if the valve sealing element permitted gradual rather than abrupt closing and opening of the openings within the valve housing for smoother operation of the valve with less wear.

SUMMARY OF THE INVENTION

The improvements in a valve according to the present invention satisfy all of the foregoing needs. The improvements are substantially as set forth in the Abstract above. Thus, an improved valve sealing element is provided which has multiple sealing surfaces which permit it to act effectively in closing two spaced valve openings alternately. The element is inexpensive and easy to produce, assemble, disassemble and repair. It includes a central valve sealing component captured by retainers, one of which retainers also acts itself as a sealing component. The central sealing component is fabricated of a resilient plastic, preferably polyurethane plastic, which has good elastic memory and is sufficiently soft to conform to dimensional irregularities in a valve opening. One of the two retainers holding the valve sealing element in place is cut shaped and provides a curved peripheral surface engageable with a second valve opening. The valve sealing element may be adjusted and the plastic valve sealing component can be readily replaced as needed. Other features of the invention are as set forth in the following detailed description and accompanying drawings.

DRAWINGS

FIG. 1 of the accompanying drawings is a fragmentary schematic side elevation, partly in section, illustrating a preferred embodiment of the improved valve sealing element of the present invention within a valve housing, alternate valve opening sealing positions being illustrated in dotted outline; and, FIG. 2 is an enlarged schematic top plan view of the improved sealing element of FIG. 1.

DETAILED DESCRIPTION

Figure 1:
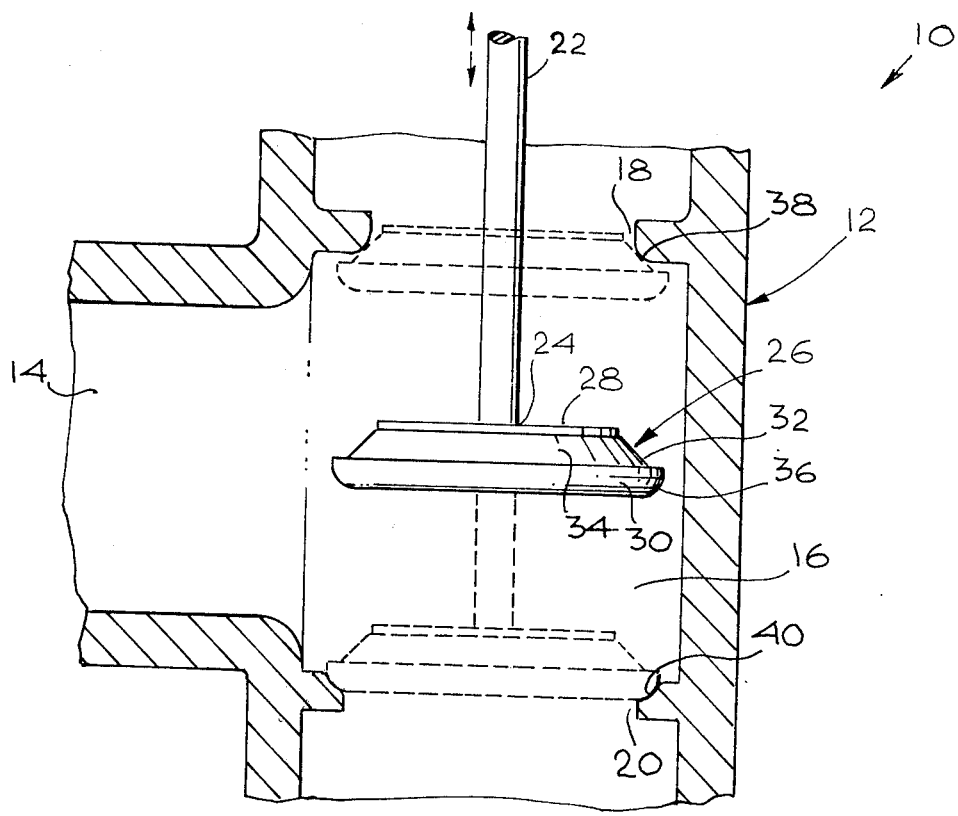
Figure 2:
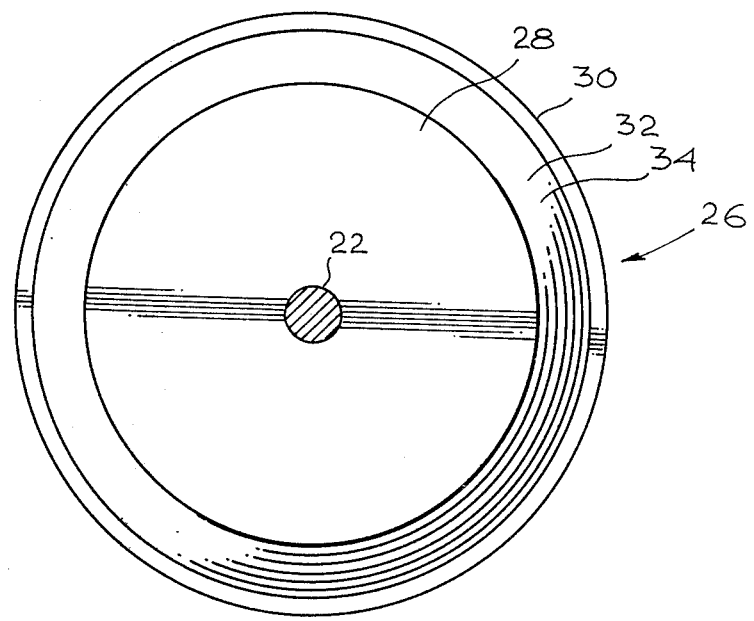

Now referring to FIG. 1 of the accopanying drawings, there is schematically depicted therein in partial section a valve 10 which includes a longitudinally extending housing 12 having one or more openings 14 in the side wall thereof and which further defines in the interior 16 thereof a pair of longitudinally spaced openings 18 and 20.

Longitudinally disposed within housing 12 in interior space 16 is a drive shaft or valve stem 22 to one end 24 of which is secured by suitable means (not shown) an improved valve sealing element 26. Element 26 comprises three components, namely a flat circular metallic disc 28 which acts as a first retainer, a shallow cup shaped metallic second retainer 30 and a valve sealing component 32 disposed between the two retainers and abutted thereto. Thus, component 32 is held within the cup like retainer 30 and extends beyond it so as to provide an exposed sealing surface 34. Surface 34 is annular and is sloped at, for example, about a 45° angle, converging towards disc 28. Thus disc 28, retainer 30 and sealing component 32 are all circular in outline, relatively flat and tightly secured together. Component 32 is fabricated of plastic, such as a thermosetting plastic which is resilient, has good elastic memory and is durable. For this purpose, polyurethane is preferred.

It will be noted that the periphery 36 of second retainer 30 is curved and annular and also provides a sealing surface as well as a seating surface for element 26.

Stem 22 moves element 26 into and out of sealing engagement with opening 18 such that the sloped sealing surface 34 bears against the adjoining surface 38 of opening 18 to gradually and effectively seal that opening. In the position for element 26 as indicated in the upper dotted outline in FIG. 1, opening 18 is closed and opening 20 is fully open. Stem 22 also moves element 26 longitudinally in housing 12 into and out of the position shown in the lower dotted outline in FIG. 1 wherein the curved periphery 36 of retainer 30 is releasably seated on the adjoining curved surface 40 defining opening 20, to close opening 20 while opening 18 is fully open. Thus, the single sealing element 26 is capable of effectively opening and closing two longitudinally spaced openings 18 and 20 in housing 12. Closure of both openings 18 and 20 is effected smoothly and gradually and alternately, utilizing inexpensive materials of durable construction. Further advantages are set forth in the foregoing.

Various modifications, changes, alterations and additions can be made in the improved valve sealing element of the present invention, the valve containing the same and the components and parameters of each. All such modifications, changes, alterations, and additions as are within the scope of the appended claims form part of the present invention.

What is claimed is:

1. In a valve having a valve housing defining first and second valve openings spaced longitudinally from each other within said housing, a valve sealing element in said housing and a valve stem connected to said valve sealing element for movement of said valve sealing element in said housing between said two openings, the improvement which comprises a three-piece valve sealing element, said valve sealing element comprising, in combination:
(a) a first hard retainer;
(b) a second generally cup-shaped hard retainer spaced from first retainer; and,
(c) a resilient sealing component disposed between and abutting said first and second retainers, said sealing component having an exposed sloped peripheral sealing surface engageable with said housing to seal said first opening, and said second retainer having a curved peripheral surface engageable with said housing to seal said second opening.

2. The improvement of claim 1 wherein said openings are generally circular, and wherein said retainers are metallic.

3. The improvement of claim 2 wherein said sealing component comprises plastic.

4. The improvement of claim 3 wherein said plastic comprises polyurethane.

5. The improvement of claim 4 wherein said first and second retainers comprise stainless steel.

6. The improvement of claim 5 wherein said stem is disposed longitudinally of said housing and said valve sealing element is secured to one end thereof and extends transversely of the housing.

7. The improvement of claim 6 wherein said first and second retainers and said sealing component are generally circular.

8. The improvement of claim 7 wherein said first retainer comprises a flat disc of smaller diameter than said sealing component and said second retainer, and wherein said sloping peripheral surface of said sealing component converges toward said first retainer disc.

* * * * *